INVENTORS:
ROBERT ADLER
MYRON L. ANTHONY
BY
Wallace, Kinzer and Dorn
Att'ys.

INVENTORS:
ROBERT ADLER
MYRON L. ANTHONY
BY Wallace, Kinzer and Dorn
Att'ys.

United States Patent Office 3,038,960
Patented June 12, 1962

3,038,960

RECORDING DEVICES

Robert Adler, Northfield, and Myron L. Anthony, La Grange, Ill., assignors to Peter G. S. Mero, Chicago, Ill.
Filed June 27, 1960, Ser. No. 38,995
15 Claims. (Cl. 178—19)

This invention relates to a new and improved control apparatus for a graphic communication system and more particularly to a new and improved modulation system and to a control system using such a modulation system to control movement of a recording stylus into and out of recording position with respect to a given recording medium.

In graphic communication systems, data in the form of handwriting, sketches, or the like are recorded in written form at a transmitter station and are simultaneously recorded in essentially the same form at a receiver station located at a remote position with respect to the transmitter. In communication apparatus of this kind, it is essential that the receiver stylus be engaged and disengaged with its associated recording medium in synchronism with the corresponding movements of the transmitter pen. Preferably, the requisite synchronous control is effected by means of an electrical signal, generated at the transmitter, which affords a positive indication as to whether or not the transmitter stylus is in contact with the recording medium at any given time.

A communication system of this kind may generate the requisite stylus control signal, commonly referred to as a pen-lift signal, by means of an electrical circuit including a pressure-responsive switch mounted upon the transmitter stylus and electrically connected to the communication circuits of the transmitter. The switch is utilized to complete or to open an electrical circuit whenever the stylus is depressed with sufficient force to bring it into contact with the recording medium at the transmitter. It is not essential, however, that there be a switch mechanically associated with the stylus; for example, the stylus may have a passive circuit incorporated therein which is completed upon contact of the stylus with the recording medium and which is effective to damp an oscillator having a principal inductance located closely adjacent the recording medium. A system of this kind is described and claimed in the co-pending application of Myron L. Anthony, Serial No. 736,317, filed May 19, 1958. Indeed, it is possible to eliminate switching at the stylus completely, as by utilizing the changes in capacity between the stylus and the recording medium occasioned by contact between these two members. A pen lift signal generating system of this kind is described and claimed in the co-pending application of Robert Adler and Myron L. Anthony, Serial No. 701,050, filed December 6, 1957, now Patent No. 2,977,414, granted March 28, 1961. The systems described in either of these two applications may be employed in conjunction with the present invention, which is concerned primarily with transmission of the pen lift signal rather than the initial generation of that signal.

It is possible, of course, to transmit the stylus control or pen lift signal over an independent circuit between the transmitter and receiver of the graphic communication system. An arrangement of this kind is not practical, however, where transmission is to be carried out over relatively long distances and may utilize telephone lines or other similar facilities. In fact, it is highly desirable that the transmission of the pen lift signal require no increase in bandwidth for the transmitted signal as compared with that required to transmit the requisite data relating to position of the stylus upon the recording medium. On the other hand, transmission of this signal cannot be permitted to interfere in any way with the signals which control movement of the receiver stylus across the face of the associated recording medium. Furthermore, and particularly where long-distance transmission is required, it is preferable that the pen lift signal be transmitted by means of frequency or phase modulation of a carrier signal in order to minimize the effects of attenuation which are present in virtually any transmission system, regardless of whether a conductive line or radio link is utilized as the transmission medium, and also to reduce the effects of noise.

It is a primary object of the invention, therefore, to provide a new and improved control system for a graphic communication system of the kind in which a recording stylus located at a remote station is controlled by the movement of a stylus at a transmitting station.

A further object of the invention is a new and improved system for transmitting two control signals simultaneously by frequency or phase modulation of a single carrier and without requiring a substantial increase in bandwidth as compared with the frequency range necessary for transmission of one of the signals.

A more specific object of the invention is a new and improved system for translating a pen lift signal from a first graphic communication station to a second station by frequency modulating a carrier which is also varied in frequency in accordance with other control data.

A further object of the invention is a new and improved stylus control system for a graphic communication system which is substantially unaffected by noise and attenuation, yet is relatively simple and economical in construction and highly sensitive in operation.

Another object of the invention is a new and improved frequency modulation system which is simple and economical in construction but highly effective and accurate in operation.

Other and further objects of the present invention will be apparent from the following description and claims and are illustrated in the accompanying drawings which, by way of illustration, show preferred embodiments of the present invention and the principles thereof and what is now considered to be the best mode contemplated for applying those principles. Other embodiments of the invention embodying the same or equivalent principles may be used and structural changes may be made as desired by those skilled in the art without departing from the present invention and the purview of the appended claims.

Figure 1:
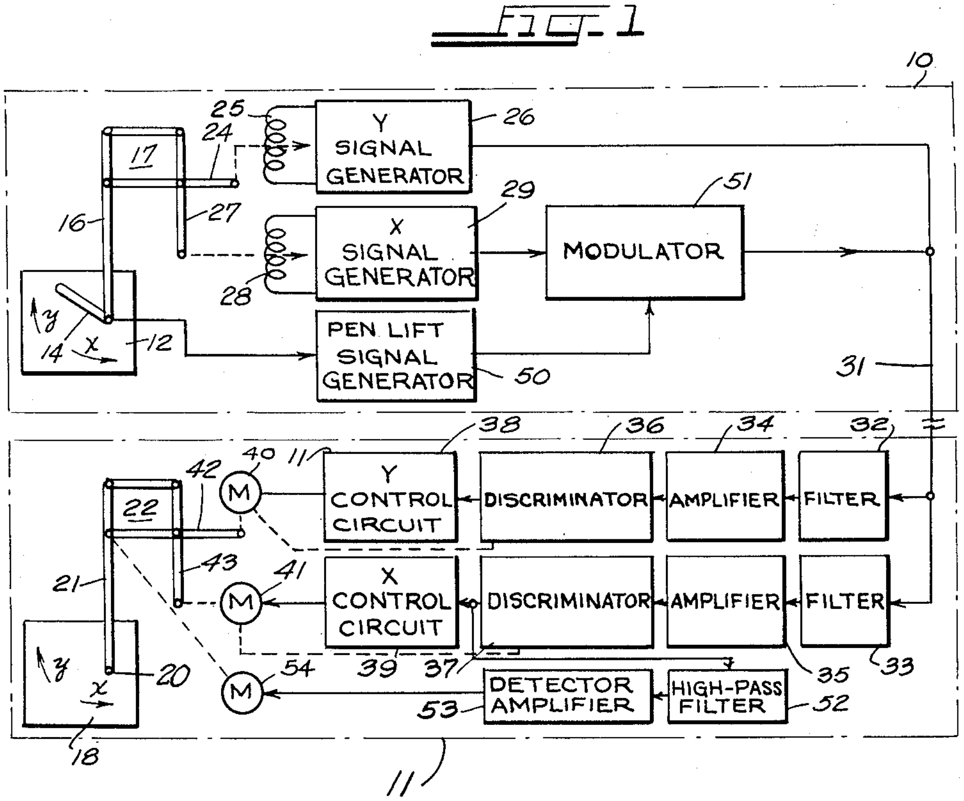
FIG. 1 is a block diagram of a graphic communication system constructed in accordance with the invention.

The communication system illustrated in FIG. 1 comprises a transmitting station 10 and a receiving station 11. In a typical system, each of the units 10 and 11 may be a transceiver adapted to function as either a transmitter or a receiver. In order to simplify the description of the invention, however, it is assumed herein that unit 10 is a transmitter and that the device 11 constitutes a receiver.

The transmitter 10 includes a writing surface 12. A pen-like recording stylus 14 is supported above the writing surface 12 and may be moved into and out of engagement with the writing surface 12. Stylus 14 is supported by a link 16 which comprises a part of a pantograph linkage 17. A sheet of paper or other suitable recording medium is supported upon the writing surface 12. Thus, the pen 14 may be guided into and out of contact with the paper and may also be moved across the paper as desired to write or to form an image on the paper. The receiver 11 is in many respects essentially similar in construction to the transmitter 10. It includes a writing surface 18 having a sheet of paper or other suitable recording medium supported thereon. The receiver further includes a recording stylus 20 supported upon an arm or link 21 which constitutes a part of the receiver recording linkage or pantograph 22.

One arm 24 of the transmitter linkage 17 is connected to a variable impedance 25 which may comprise a variable capacitor or a variable inductor as illustrated. The inductor 25 is electrically connected to and forms a part of the Y coordinate transmitter signal generator 26. Similarly, a second arm 27 of the linkage is mechanically connected to a variable inductor 28 which comprises a part of the X coordinate signal generator 29. The output stages of the two coordinate signal circuits 26 and 29 are coupled to each other and to the receiver 11, as by means of the conductor 31.

In the receiver 11, the transmission line 31 is electrically coupled to two band-pass filters 33 and 34. The filter 32 is coupled to an amplifier 34 and the filter 33 is coupled to a similar amplifier 35. The amplifiers 34 and 35 are individually coupled to a pair of discriminators 36 and 37, which, in turn are coupled, respectively, to two receiver control circuits 38 and 39. The receiver control circuits 38 and 39 control the X and Y coordinate movements, respectively, of the receiver stylus 20. The Y coordinate control circuit 38 is electrically and mechanically coupled to a motor or other suitable actuating device 40 which in turn is mechanically linked to an arm 42 of the receiver linkage 22. Similarly, the X coordinate receiver circuit 39 is coupled to a second motor 41 which is mechanically linked to an arm 43 of the linkage 22. The devices 36, 38 and 40 comprise a complete servo control system, and the devices 37, 39 and 41 afford a similar servo system, the latter servo system being described more fully hereinafter in connection with FIG. 5.

The communication system illustrated in FIG. 1, as thus far described, is essentially similar in construction and operation to the system described and claimed in Patent No. 2,583,720, issued January 29, 1952, to Robert Adler and the parallel linkage systems 17 and 22 are described in detail and claimed in Patent No. 2,583,535, to Robert Adler issued January 29, 1952. Accordingly, only a relatively brief description of the operation of the system is necessary herein.

Movement of the transmitter stylus 14 along the Y axis results in a corresponding movement of the variable element of the inductor or other variable impedance device 25. Consequently, this movement of the stylus may be utilized to vary the frequency or amplitude of a coordinate control signal of given fundamental frequency generated in the circuit 26. Similarly, movement of the transmitter stylus 14 along the X axis can be employed to vary the frequency or amplitude of a second coordinate control signal generated in the circuit 29. The two modulated coordinate control signals are preferably of different fundamental frequency, and thus may be transmitted to the receiver 11 along line 31, or along some other suitable transmission link, without substantial loss of intelligence. The received signals are separated by the filters 32 and 33 and are amplified in the circuits 34 and 35 before being applied to the two discriminators 36 and 37. In the discriminators, the signals are utilized to generate control signals which are applied to circuits 38 and 39, which may comprise suitable filters and, preferably, one or more stages of amplification. The output signals from the circuits 38 and 39 are applied to the control motors 40 and 41, respectively, to drive the parallel linkage 22 and to move the stylus 20 across the writing surface 18 in synchronism with movement of the stylus 14 across the transmitter writing surface 12. Accordingly, the receiver stylus traces a path on the surface 18 similar to that traced by the transmitter stylus upon the surface 12.

If the receiver stylus 20 were maintained continuously in contact with the recording medium on writing surface 18, it would not be possible to reproduce certain forms of intelligence in legible or interpretable form at the receiver. For example, in written communication it is usually necessary that the stylus 20 be moved from its recording or contact position to an inactive or non-recording position each time a word is terminated and another word is started. At the same time, it is usually necessary to continue the transverse movement of the stylus with respect to the writing surface 18 in order to bring the receiver stylus into position for beginning the next word. The same requirements are present for other types of data which may be transmitted over the communication system, including drawings, sketches, and other information. Consequently, a control or pen lift signal generator circuit 50 is incorporated in the transmitter 10 and is utilized to generate a control signal which is representative of movement of the stylus 14 into and out of recording position with respect to the recording medium disposed on the writing surface 12.

The signal generator 50 preferably comprises an oscillator operating at a relatively low frequency. On the other hand, for reasons pointed out more fully hereinafter, the frequency of the oscillator 50 must be substantially higher than the rate at which the operating frequency of the signal generator 29 is changed by variations in the variable impedance 28 resulting from movement of the stylus across the surface 12. As noted hereinabove, the stylus 14 may be equipped with a switch which is closed upon contact of the stylus with the recording medium or writing surface 12, and this switch may be utilized to energize or otherwise actuate the oscillator 50 upon contact of the stylus with the writing surface. On the other hand, other systems which do not require that the pen or stylus be mechanically or electrically connected to any other circuit element may be utilized, preferred arrangements of this kind being set forth in the two aforementioned co-pending applications. In any event, and regardless of the coupling utilized to link the generator 50 to the stylus 14, the signal generator is employed to develop an output signal which is indicative of movement of the stylus into and out of contact with its associated recording medium.

The pen lift signal generator 50 is coupled to a modulator 51 which is also coupled to the control signal generator 29. In the modulator 51, the output signal from the generator 50 is utilized to modulate the frequency of the output signal from the control generator 29. Thus, the one coordinate signal is modulated or varied in frequency or phase in response to movements of the stylus 14 in a direction parallel to the writing surface 12 and is also frequency-modulated in response to movement of the stylus between a recording position and an inactive position, the latter movements being in a direction substantially normal to the recording medium.

In the receiver 11, as shown in the block diagram of FIG. 1, the discriminator 39 is electrically coupled to a high pass filter 52, in addition to the aforementioned coupling to the control circuit unit 39. The high pass filter 52, in turn, is coupled to a detector-amplifier 53, the output of which is coupled to a motor, solenoid, or other electro-mechanical device 54. The device 54 is mechanically connected to the linkage 22 and is utilized to move the stylus 20 into and out of contact with the writing surface 18 at the receiver.

Upon first examination, it might appear that the data relating to movements of the stylus 14 in the X coordinate direction would be confused with movements of the stylus into and out of contact with the recording medium, since electrical signals representative of both kinds of stylus movement are utilized to frequency-modulate a single carrier signal developed by the circuit 29. Actually, however, such confusion is completely avoided by taking advantage of certain characteristics of the graphic communication system. Thus, the rate of change of movement of the stylus 14 in the X coordinate direction is relatively limited, depending solely upon the speed of the writing or drawing movements of the operator. In a practical system, the rate of change of direction of movement of the stylus 14 can scarcely exceed ten cycles per second and actually it is usually limited to less than eight cycles per second. That is, the direction of movement along either axis can be reversed, at a maximum, only eight to ten times per second. On the other hand, the output signal from the generator 50, although relatively low in frequency as compared with the carrier signal, may be of the order of 100 cycles per second. Thus, by making the rate of frequency variation effected in the carrier signal by the pen lift circuit substantially greater than the maximum rate of change afforded by the X coordinate control system, confusion between the two kinds of information is effectively avoided. At the same time, the output signal from the signal generator 50 may be well within the range of the maximum frequency shift of the oscillator 29 occasioned by the variations in the impedance 28 caused by movement of the pen 14 across the surface 12. For example, the signal generator 29 may operate on a fundamental frequency of 2200 cycles with a maximum frequency swing of 140 cycles, plus or minus, in response to movements of the pantograph arm 27. Nevertheless, the operating frequency of the signal generator 50 may be 100 cycles or even less, as long as the frequency modulation of the carrier signal caused by the pen lift signal is substantially in excess of the rate at which frequency changes can be effected by movement of the pantograph arm. For the purposes of this application, "maximum rate of change in frequency" of the carrier resulting from movement of the stylus along the X or Y axis refers to the rate at which the direction of movement of the stylus can be reversed.

Figures 2, 3:
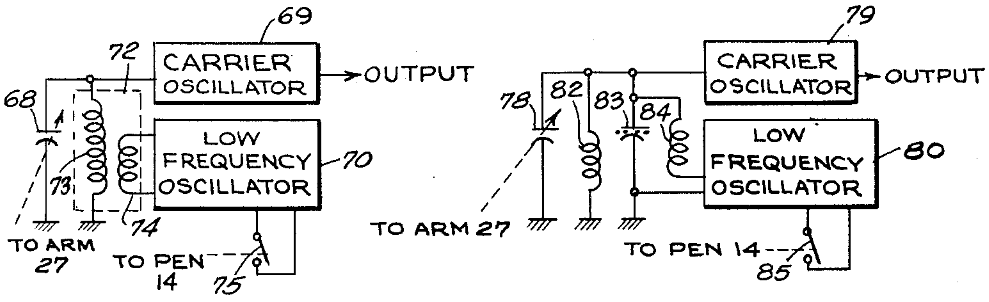
FIG. 2 is a simplified schematic diagram of one form of transmitter apparatus which may be used in the system of FIG. 1.
FIG. 3 is a simplified diagram of another form of transmitter apparatus.

FIG. 2 illustrates, in greatly simplified form, one type of apparatus which may be utilized to perform the functions associated with the variable impedance 28, the signal generator 29, the signal generator 50, and the modulator 51 in the transmitter 10 of FIG. 1. This apparatus comprises a carrier oscillator 69 which corresponds to the X coordinate signal generator 29 and is provided with a frequency-determining circuit comprising a variable capacitor 68 connected in parallel with the principal inductance 73 of a field-sensitive variable reactor 72. The variable reactor 72 also includes an auxiliary or field coil 74 which is coupled to a low frequency oscillator 70, the oscillator 70 corresponding to the signal generator 50 in the circuit of FIG. 1. Circuit 70 also applies a D.C. bias or saturating current to the auxiliary coil 74; a separate winding may be used in the reactor for this purpose if desired. In this arrangement, the variable reactor 68 is mechanically connected to the operating arm 27 of the pantograph, whereas the oscillator 70 is connected to a switch 75 that is controlled by movements of the transmitter pen 14 into and out of contact with its associated recording medium.

In operation, and assuming that the arm 27 is in an initial position corresponding to location of the stylus at the center of the X axis, but is not in contact with the recording medium, the carrier oscillator 69 generates a carrier signal having a given fundamental frequency. If the stylus is moved in a direction parallel to the recording medium and along the X axis, the capacitor 68 is adjusted and is effective to change the operating frequency of the carrier oscillator. As noted hereinabove, these changes take place at a relatively slow rate, being limited by the speed at which the operator is able to move the stylus 14 parallel to the recording medium.

In the course of movement of the stylus, it is of course necessary to bring it into contact with the writing surface 12 in order to carry out a recording operation. When this occurs, the switch 75 is closed, applying to the field coil 74 of the reactor 72 an electrical signal which is relatively low in frequency as compared to the carrier frequency. As a consequence, the inductance of the coil 73 alternately increases and decreases at a rate corresponding to the operating frequency of the oscillator 70. This variation of inductance of the coil 73 is effective to modulate the operating frequency of the carrier oscillator 69, the changes on carrier frequency occurring at a much higher rate than those provided by the mechanical movement of the variable capacitor 68. Thus, the output signal from the carrier oscillator 69 is frequently modulated in two different kinds of movement of the pen or stylus 14.

A somewhat similar arrangement is illustrated in FIG. 3, which comprises a carrier oscillator 79 having a frequency-determining circuit including a variable capacitor 78 which is mechanically connected to the pantograph arm 27. The resonant circuit of the oscillator also includes an inductance 82 and a capacitor 83, both of which are connected in parallel with the capacitor 78. The capacitor 83 is of the voltage-sensitive type and is coupled to a low frequency oscillator 80. As in the circuit of FIG. 2, the circuit 80 may also be employed to apply a D.C. bias across capacitor 83, a choke coil 84 being incorporated in the return circuit to prevent coupling of the high-frequency carrier signal from the oscillator 79 to the low-frequency oscillator 80. As before, the oscillator 80 is controlled by a switch 85 which is mechanically or electrically controlled by movement of the pen 14 into and out of contact with the recording surface 12 (see FIG. 1).

The operation of the circuit of FIG. 3 is substantially similar to that of FIG. 2. Movement of the pantograph arm 27 caused by movement of the pen or stylus 14 in the X coordinate direction is effective to change the capacity of the variable capacitor 78 and thus modulates the output frequency of the oscillator 79. On the other hand, opening and closing of switch 85 to energize the oscillator 80 is effective to change the impedance of the capacitor 83 and thus also modulates the output signal from the oscillator 79. As before, the operating frequency of the oscillator 80 must be substantially above the maximum rate of change in frequency which may be effected by movement of the arm 27. On the other hand, this oscillator preferably operates at a much lower frequency than the carrier oscillator 79.

From the foregoing, it will be apparent to those skilled in the art that virtually any known frequency modulation or phase modulation apparatus may be adapted to use with the present invention. For example, the modulation systems illustrated in FIGS. 2 and 3 may be replaced by a vacuum tube modulator of the variable reactance type, or by its transistor equivalent. Bridge-type modulators and other circuits may similarly be utilized.

Figures 4, 4A, 5:
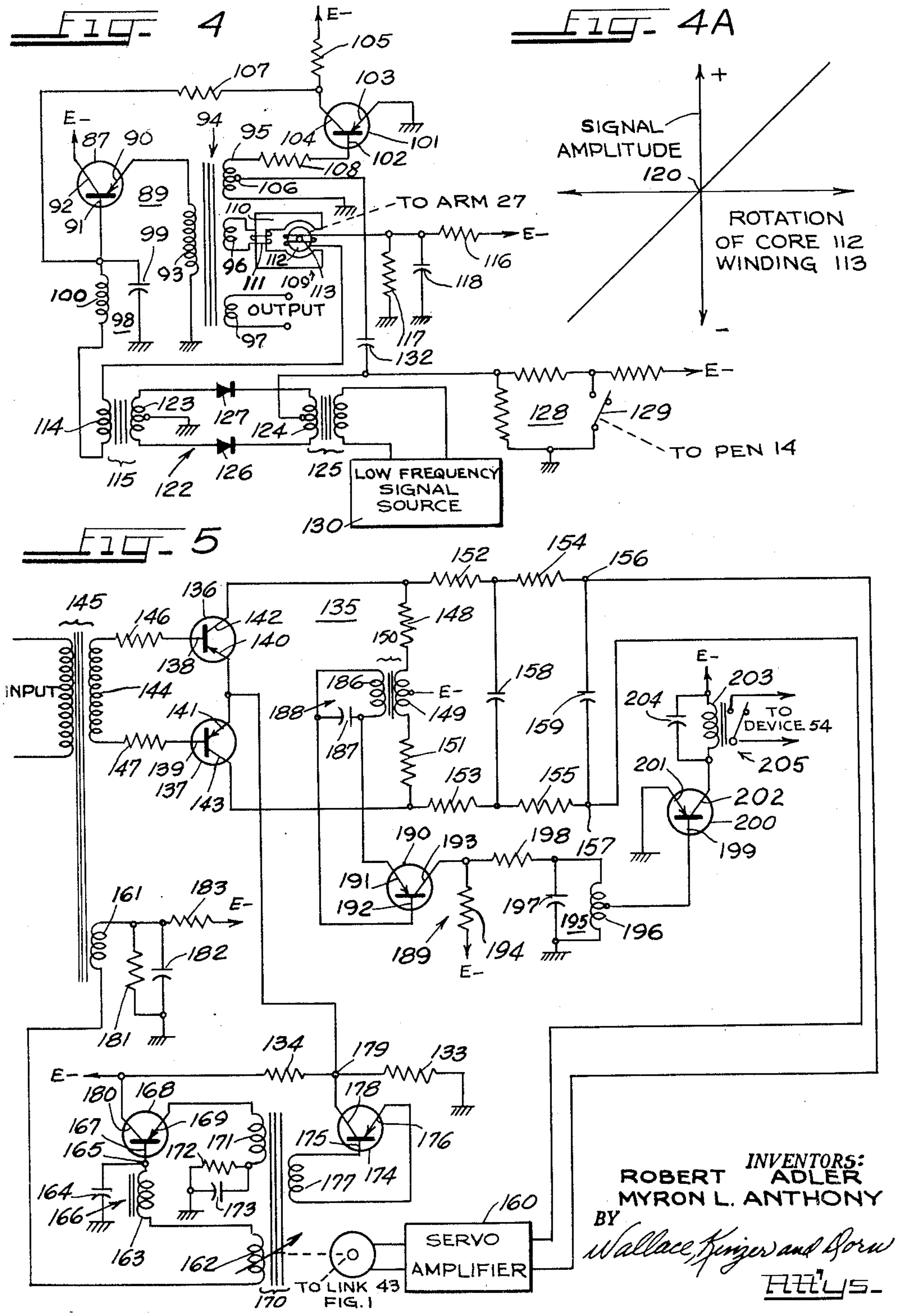
FIG. 4 is a detailed schematic diagram of a preferred form of transmitter apparatus.
FIG. 4A is an explanatory diagram used to explain the operation of one part of the circuit of FIG. 4.
FIG. 5 is a schematic diagram of a further embodiment of the invention, fomprising receiver apparatus suitable for use with any of the transmitter circuits.

FIG. 4 illustrates, in substantial detail, the modulator system which constitutes the preferred form of the invention as presently conceived and developed. This circuit includes a transistor 87 connected in an oscillator circuit generally designated by reference numeral 89. Transistor 87 includes an emitter electrode 90, a base electrode 91, and a collector electrode 92. The emitter electrode is connected to ground through the primary winding 93 of an output transformer 94 having three secondary windings 95, 96 and 97. The collector electrode 92 is connected to a source of unidirectional operating potential designated as E—, whereas the base electrode 91 is connected to a frequency-determining circuit 98 including a capacitor 99 and an inductor 100.

The output stage of the modulating and control system illustrated in FIG. 4 comprises a second transistor 101, connected as a grounded-emitter limiter amplifier, having a base electrode 102, an emitter electrode 103, and a collector electrode 104. The base electrode 102 is connected through a resistor 108 to one end of the secondary winding 95 of the transformer 94. A tap 106 on winding 95 comprises an input terminal for the modulator of the system, as explained more fully hereinafter. The other end terminal of the winding is returned to ground. The emitter 103 is grounded and the collector 104 is connected to the D.C. source E— through a resistor 105. The collector 104 is also coupled to the base electrode 91 of the transistor 87 through a circuit which comprises a coupling resistor 107.

The secondary winding 96 of the transformer 94 is connected to a circuit which is utilized to change the operating frequency of the oscillator 89 in response to movements of the arm 27 (see FIG. 1) in accordance with movement of the transmitter stylus in a direction parallel to the surface of the recording medium. This control arrangement includes a position transformer 109 including a substantially U-shaped core 110 having a coil 111 wound thereon, the coil 111 being electrically connected to the transformer secondary 96. A second core 112 is positioned in the open portion of the core 110 and is spaced from the core 110 by a relatively large air gap. On this core 112 where provided a secondary coil 113 which preferably is coinfined to a relatively narrow zone upon the core 112 and is aligned with a diameter thereof. One terminal of the coil 113 is connected to the principal inductance 100 of the oscillator through a circuit including the secondary winding 114 of a transformer 115. The other terminal of the coil 113 is connected to the D.C. source E— through a biasing and filter circuit including a series resistor 116 and the parallel combination of a resistor 117 and a capacitor 118, the latter two impedances being returned to ground.

The effect of rotation of the core 112 upon the output signal from the position transformer 109 is illustrated in FIG. 4A. Starting from a neutral position 120, in which the coil 113 is equally spaced from the two arms of the core 110 and extends parallel to the center line of the gap between the arms, it is seen that rotation of the core in one direction causes a substantially linear increase in signal at a given phase angle, whereas rotation from the opposite direction causes a similar linear increase in signal amplitude but with a phase shift of 180°. Stated differently, it is seen that rotation of the core 112 is effective to generate signals of opposed phase in the coil 113, the amplitude of the signal in each instance being dependent upon the extent of rotation and the phase being determined by the direction of rotation, and no signal being generated in the coil at the initial or null position 120. The variations in signal output from the coil 113 are utilized to modify the operating frequency of the oscillator 89, in the manner set forth in Patent No. 2,707,232 to Robert Adler, issued April 26, 1955 and as described more fully hereinafter, rotation of the core 112 being controlled by a mechanical connection to the arm 27 of the transmitter pantograph. The third secondary winding 97 of the transformer 94 affords an output circuit for the modulation system.

The system of FIG. 4 includes a bridge-type modulator circuit 122. The modulator circuit 122 comprises the primary winding 123 of the transformer 115 and the secondary winding 124 of a coupling transformer 125. The corresponding terminals of the two transformers are connected to each other by means of a pair of diodes 126 and 127 to form a simplified bridge-type modulating circuit. The center terminal 106 of the transformer winding 95 is coupled through a capacitor 132 to a center tap on the winding 124, whereas the center tap on the winding 124 is grounded. The primary winding of the transformer 125 is coupled to a low frequency oscillator or other low frequency source 130, which may comprise any suitable circuit for generation of a signal in the frequency range found desirable for the pen lift signal. Unlike the previously described arrangements, the signal source 130 is not directly coupled to the transmitter pen 14 (see FIG. 1). Instead, equivalent control is afforded by a biasing circuit 128 which connects the center tap on the transformer winding 124 to the negative D.C. source E— to maintain the diodes 126, 127 normally non-conductive. The circuit 128 includes a control switch 129, connected to the pen, which may be employed to control operation of the modulator 122 as described hereinafter.

Insofar as the oscillator 89 is concerned, the circuit of FIG. 4 operates as an emitter follower having a frequency determined primarily by the capacitor 99 and the inductor 100, the inductance of the two transformer windings 113 and 114 connected in series with the inductor 100 being made very small in comparison with the inductance of the coil 100. The feedback circuit of the oscillator includes the transistor 101, which is biased to operate as a limiting amplifier, and the coupling circuit between the transistor 101 and the base 91 of the transistor 87. Of course, the fundamental operating frequency of the carrier oscillator 89 is not critical and may be selected in accordance with the requirements of the system in which the oscillator is employed. In a typical system for example, the fundamental frequency of the carrier oscillator 89 may be of the order of 2200 cycles per second. Thus, assuming that the position transformer secondary 113 is in the null position 120 (see FIG. 4A) and the modulator 122 is not energized, the output signal appearing at the output winding 97 is a signal of substantially constant frequency, the frequency being determined essentially by the resonant circuit 98.

With the carrier oscillator 89 in operation, movement of the arm 27 may rotate the core 112 and the secondary 113 of the position transformer 110 to generate in the winding 113 a signal which may be either a bucking or boosting signal, relative to the applied current depending on the direction of rotation of core 112. If the charging current is increased, as by generation of a boosting voltage in the rotor coil, the apparent capacitance of the circuit 98 is increased and the resonant frequency of the circuit is decreased. Similarly, if the output from the rotor coil 113 bucks the applied voltage, the apparent capacitance of the circuit is decreased, resulting in an increase in the operating frequency. Accordingly, rotation of the position transformer core increases or reduces the operating frequency of the circuit 89 depending on the direction of rotation by an amount representative of the rotation of the position transformer core. It will be recognized that this control arrangement for the circuit 89 is substantially similar to that described in the aforementioned Patent No. 2,707,232 to Robert Adler.

In the preceding discussion it has been assumed that the modulator 122 has no effect on the output signal of the system. This is true as long as the pen-actuated switch 129 remains open, since the diodes of the modulator are both biased to be non-conductive. Upon closing of the switch 129, however, this condition no longer obtains. The switch, when closed, effectively shunts a part of the biasing circuit and substantially reduces the negative bias applied to the anodes of the diodes 126, 127. Thus, assuming that the low-frequency source 130 is energized and supplies an output signal to the transformer 125, the diodes 126 and 127 are driven to conduction and rendered nonconductive in alternation with each other at a frequency corresponding to the operating frequency of the source 130. Under these circumstances, with the two halves of the modulator circuit 122 alternately conductive and nonconductive, the carrier-frequency signal developed in the transformer winding 95 is effectively fed back to the resonant circuit 98 through the transformer 115, with the polarity of the feedback signal reversing at a rate determined by the operating frequency of the oscillator 130. Stated differently, the operating signal from the winding 95 is effectively applied to the inductor 100 in alternately adding and subtracting relationship. Accordingly, the apparent inductance of the coil 100 is alternately increased and decreased by an amount determined by the amplitude of the feedback signal and at a frequency determined by the operating frequency of the signal source 130. Consequently, the output signal appearing across the winding 97 is effectively modulated in accordance with the operating frequency of the low-frequency source 130. As noted hereinabove, the operating frequency of the source 130 should be substantially greater than the maximum rate of change in frequency afforded by movements of the position transformer core 112 and, in a typical system, may be of the order of 100 cycles per second or more.

On the other hand, the total change in carrier frequency which may be effected by maximum movement of the position transformer core 112 may be made substantially greater than the operating frequency of the low-frequency source 130. For example, in a system wherein the circuit 130 operates at a frequency of 120 cycles per second, the maximum frequency swing effected by movements of the position transformer rotor 112 may be 140 cycles per second or more. It is thus apparent that the modulation of the carrier frequency occasioned by the source 130 and the modulator 122 need not materially increase the total bandwidth required for the system, with the result that no special facilities are required for transmitting the pen lift signal.

FIG. 5 illustrates a preferred form of receiver circuit for developing control signals representative of movements of the transmitter stylus and may be considered to afford a preferred arrangement for the circuits 37, 52, and 53 in the receiver 11 (see FIG. 1). The receiver arrangement of FIG. 5 comprises a discriminator 135 including a pair of transistors 136 and 137. The transistor 136 includes a base electrode 138, an emitter electrode 140, and a collector electrode 142 and the transistor 137 includes a base electrode 139, an emitter 141, and a collector electrode 143. The emitter electrodes 140 and 141 are connected together and to a voltage divider, comprising two resistors 133 and 134 the voltage divider being connected between the D.C. source E— and ground. The base electrodes 138 and 139 are connected to the secondary winding 144 of an input transformer 145 by means of a pair of resistors 146 and 147, respectively. The primary winding of the transformer 145 is suitably coupled to the input circuit of the receiver, such as the amplifier 35 of FIG. 1.

The output circuit of the discriminator 135 is essentially a low-pass filter. In the illustrated arrangement the collector electrode 142 of the transistor 136 is connected to a source of unidirectional operating potential E— through a resistor 148 and a center tap on the primary winding 149 of a transformer 150. Similarly, the collector electrode 143 is connected to the D.C. source through a resistor 151 and the center tap of the winding 149. A pair of resistors 152 and 154 are connected in series with each other between the collector electrode 142 and a first output terminal 156 of the low-pass filter. A corresponding pair of resistors 153 and 155 are connected in series between the collector electrode 143 and the second output terminal 157 of the discriminator. The low-pass filter is completed by a pair of capacitors 158 and 159 interconnecting the two branches of the filter circuit. The output terminals 156 are coupled to the motor or other device 41 through a suitable servo amplifier 160.

The discriminator 135 also includes a phase shifting circuit in the input stage thereof. In the simplified arrangement illustrated in FIG. 5, this circuit comprises an additional secondary winding 161 on the input transformer 145. One end of the secondary winding 161 is connected to a secondary winding on a transformer 170, being coupled through the winding 162 to an inductance coil 163 which forms, with a capacitor 164, a resonant circuit 166. The common terminal of the two elements 163 and 164 is indicated by reference numeral 165. The resonant circuit 166 constitutes a frequency responsive phase shifting device for generating a control signal for the discriminator, as described more fully hereinafter. The inductance of the transformer windings 161 and 162 should be made quite small relative to the inductance of the coil 163, so that the coil 163 constitutes the principal inductive element of the tuned circuit 166.

The terminal 165 of the resonant circuit 166 is connected to the base electrode 167 of a transistor 168, the transistor 168 being incorporated in the first stage of a control signal amplifier. The emitter electrode 169 of the transistor is connected to the primary winding 171 of the transformer 170, the winding 171 being returned to ground through a resistor 172. The resistor 172 is bypassed by a capacitor 173. The collector electrode 180 of the transistor 168 is connected to the D.C. source E—.

A second transistor 174 is included in the control amplifier, the base electrode 175 and the emitter electrode 176 of this transistor being connected across a secondary winding 177 on the transformer 170. The collector electrode 178 of the transistor 174 is connected to the terminal 179 of the voltage divider 133, 134, and thus is connected back to the emitter electrodes 140 and 141 of the two discriminator transistors 136 and 137.

The control amplifier circuit is completed by a return circuit for the coil 161. Thus, the terminal of the coil 161 opposite that connected to the winding 162 is connected to a voltage divider comprising a resistor 181 and a second resistor 183, the resistor 181 being returned to ground and the resistor 183 being connected to the D.C. source E—. A bypass capacitor 182 is connected in shunt with the resistor 181.

The discriminator 135, and the associated low-pass filter circuit, as thus far described, is essentially similar to the discriminators described and claimed in the copending application of Myron L. Anthony, Serial No. 701,282, filed December 2, 1957. The discriminator generates an output signal having an amplitude and polarity representative of variations in the frequency of the intelligence signal applied thereto through the transformer 145 with respect to a reference frequency determined by the tuning of the series resonant circuit 166. The output across the terminals 156 and 157 is negligible at the reference frequency and the peak-to-peak output voltage is approximately equal to the E— voltage. The discriminator is inherently self-limiting and is substantially immune to harmonic disturbances. Moreover, the low-pass filter in the output circuit of the discriminator is effective to eliminate virtually all high-frequency components in the output signal; accordingly, the signal appearing across the terminals 156 and 157 may be utilized directly to drive the motor 41 and hence the pantograph arm 43 in the receiver (see FIG. 1). Ordinarily, however, it is necessary to amplify the output signal from the discriminator, as by the amplifier 160, in order to afford a strong enough signal to drive the motor or other device 41.

Preferably, a servo system is utilized in controlling the link 43, in order to achieve optimum stability and accuracy in operation of the pen linkage 22 (see FIG. 1). Thus, means are provided for varying the coupling of the winding 162 to the core of the transformer 170 in response to operation of the motor 41. Typically, the winding 162 may be mounted on a rotor which is substantially encompassed by the transformer core, in an arrangement essentially similar to the construction described hereinabove for the transformer 109, FIG. 4. The rotor may then be mechanically coupled to the motor 41, rotational movement of the rotor being thus made proportional to translational movement of the link 43 so that the coupling between the winding 162 is modified proportionally.

In operation, the winding 162 couples the output signal from the emitter circuit of the transistor 168, comprising transformer primary 171, back in series with the inductance 163 in the base circuit of the transistor. It is thus seen that a variation in the coupling between the winding 162 and the transformer core effectively modifies the resonant frequency of the tuned circuit 166 in the same manner that variations in coupling of the coil 112 to the core 110 effectively change the resonant frequency of the circuit 98 in FIG. 5. In the receiver, of course, there is no positive feedback circuit to the resonant circuit 166, since independent oscillation is not desired. It is thus seen that the circuits and mechanical connections comprising the transformer 170, the discriminator 135, the amplifier 160, and the motor 41 afford a complete servo loop which is effective to control the movement of the pen (FIG. 1) in one coordinate direction. Thus, a change in frequency in the output signal from the transformer 170 results in an output signal from the discriminator 135 that drives the motor 41. The motor 41, in turn, changes the coupling of the winding 162 in a sense tending to effect an opposite change in the frequency of the signal supplied to the transformer 170, thereby stabilizing the system and limiting control to variations in the input signal supplied from the input transformer 145.

The secondary winding 186 of the transformer 150 is connected to a capacitor 187 to form a resonant circuit 188 which is tuned to the operating frequency of the pen left oscillator at the transmitter of the system. The tuned circuit 188 is coupled to a detector circuit 189 comprising a transistor 190 having an emitter 191, a base electrode 192, and a collector electrode 193. One terminal of the winding 186 is connected to the emitter 191 and the other terminal is connected to the base electrode 192. The collector electrode 193 is connected to the D.C. source E— through a load resistor 194. The collector is also connected to a parallel resonant circuit 195, comprising an inductor 196 and a capacitor 197, by means of a coupling resistor 198. One terminal of the coil 196 is connected to the coupling resistor and the other terminal is returned to ground.

The electrical center of the inductance coil 196 is connected to the base electrode 199 of a transistor 200, which comprises a limiter amplifier. The emitter 201 of the transistor 200 is grounded and the collector electrode 202 is connected to the D.C. source E— through a relay operating coil 203. The coil 203 which is preferably by-passed by a capacitor 204, constitutes the operating coil of a relay 205 which is connected to an energizing circuit for the pen lift motor or solenoid 54 (see FIG. 1).

As noted hereinabove, the discriminator 135 develops an output signal having an amplitude and polarity representative of changes in the frequency of the input signal. Some of these frequency changes take place at a relatively slow rate, these being the frequency variations introduced at the transmitter in accordance with movements of the pen parallel to the writing surface. Other frequency variations, occurring at a much higher rate, are produced by the modulation of the carrier in accordance with the low frequency oscillator signal controlled by movement of the pen into and out of contact with the recording medium. These relatively high-frequency variations in the output signal of the discriminator, which occur at a rate corresponding to the operating frequency of the oscillator 130 in the embodiment of FIG. 4, for example, induce in the tuned circuit 188 a control signal which is effectively representative of movements of the stylus into and out of contact with its recording medium, since the low-frequency variations do not materially affect the tuned circuit. The resulting control signal is detected in the detector circuit comprising the transistor 190 and is applied to the tuned circuit 195. The detected control signal is effectively applied to the base of the amplifier transistor 200, which operates as a limiter and which is effective to energize the relay 205 whenever a control signal of substantial amplitude is present in the tuned circuit. Accordingly, the relay 205 is closed whenever a relatively high-frequency variation is present in the received carrier signal but otherwise remains open, with the result that the pen lift control relay is actuated independently of modulation of the carrier in response to movement of the stylus across the writing surface. Of course, since substantially the same kind of modulation is effected in the circuits of FIGS. 2 and 3, the receiver circuit illustrated in FIG. 5 may be employed to equal advantage in connection with these transmitter arrangements. Moreover, it should be understood that FIG. 5 represents only a preferred receiver circuit and that other and more conventional discriminator and detector arrangements may be utilized if desired.

From the foregoing description, it will be apparent that the record communication system of the invention provides an effective and efficient arrangement for transmitting a pen lift signal which is also utilized to convey data relating to movement of the pen across a writing surface. Moreover, the invention provides for simultaneous frequency modulation of the carrier in accordance with both kinds of data and without requiring any increase in bandwidth for the transmitted signal. This is particularly important in applications in which the required bandwidth must be held to a minimum, as where telephone lines or other relatively crowded transmission media are employed to link transmitter and receiver stations. The apparatus employed by the invention is relatively simple and inexpensive to construct, yet is substantially noise immune by virtue of the fact that frequency modulation is employed for transmission and also because the detector arrangement of the receiver may be made extremely sensitive and therefore rejects virtually all extraneous signals.

Hence, while we have illustrated and described the preferred embodiments of our invention, it is to be understood that these are capable of variation and modification, and we therefore do not wish to be limited to the precise details set forth, but desire to avail ourselves of such changes and alterations as fall within the purview of the following claims.

We claim:

1. A graphic communication system of the kind including a transmitter unit and a receiver unit, each of said units including a stylus and a recording medium, each of said styli being movable parallel to its associated recording medium and normal to its associated recording medium to reproduce data thereon, said system comprising: a carrier signal generator for developing a carrier signal having a given fundamental frequency; means, effectively coupled to said transmitter stylus and to said carrier signal generator, for varying the frequency of said carrier signal in response to movements of said stylus in a direction parallel to its associated recording medium; means, coupled to said transmitter stylus and to said carrier signal generator, for modulating the frequency of said carrier signal in response to movement of said stylus, normal to its associated recording medium, between a recording and an inactive position; means for transmitting said carrier signal from said transmitter to said receiver; discriminator means, in said receiver, for utilizing said carrier signal to develop a data signal representative of variations in frequency of said carrier signal; filter means, coupled to said discriminator means, for developing first and second control signals representative of movements of said transmitter stylus parallel to and normal to said recording medium, respectively; and first and second control means, coupled to said filter means and controlled by said first and second control signals, respectively, for moving said receiver stylus, with respect to its associated recording medium, in accordance with the movements of said transmitter stylus.

2. A graphic communication system of the kind including a transmitter unit and a receiver unit, each of said units including a stylus and a recording medium, each of said styli being movable parallel to its associated recording medium and normal to its associated recording medium to reproduce data thereon, said system comprising: a carrier signal generator for developing a carrier signal having a given fundamental carrier frequency; first means, effectively coupled to said transmitter stylus and to said carrier signal generator, for varying the frequency of said carrier signal at a rate and by an amount representative of movements of said stylus parallel to its associated recording medium; means, coupled to said transmitter stylus and to said carrier signal generator, for modulating the frequency of said carrier signal at a fixed rate substantially greater than the maximum rate of change in frequency afforded by said first means, in response to movement of said stylus into and out of contact with its associated recording medium; means for transmitting said carrier signal from said transmitter to said receiver; discriminator means, in said receiver, for utilizing said carrier signal to develop a data signal representative of variations in frequency of said carrier signal; filter means, coupled to said discriminator means, for developing first and second control signals representative of movements of said transmitter stylus parallel to and normal to said recording medium, respectively; and first and second control means, coupled to said filter means and controlled by said first and second control signals, respectively, for moving said receiver stylus, with respect to its associated recording medium, in accordance with the movements of said transmitter stylus.

3. A graphic communication system of the kind including a transmitter unit and a receiver unit, each of said units including a stylus and a recording medium, each of said styli being movable parallel to its associated recording medium and normal to its associated recording medium to reproduce data thereon, said system comprising: a carrier signal oscillator for developing a carrier signal having a given fundamental carrier frequency; first means, effectively coupled to said transmitter stylus and to said carrier signal oscillator, for varying the frequency of said carrier signal at a rate and by an amount representative of movements of said stylus parallel to its associated recording medium; a control signal generator for generating a control signal having a frequency substantially greater than the maximum frequency at which said transmitter stylus can be reversed in its direction of movement but within the range of maximum change in frequency of said carrier signal effected by said first means; means, coupled to said transmitter stylus, for coupling said control signal generator to said carrier signal oscillator to modulate said carrier signal in accordance with said control signal and in response to movement of said stylus into and out of contact with its associated recording medium; means for transmitting said carrier signal from said transmitter to said receiver; demodulating means, in said receiver, for utilizing said carrier signal to develop first and second control signals representative of movements of said transmitter stylus parallel to and normal to said recording medium, respectively; and means, coupled to said demodulating means and controlled by said control signals, for moving said receiver stylus, with respect to its associated recording medium, in accordance with the movements of said transmitter stylus.

4. In a graphic communication system of the kind including a transmitter unit and a receiver unit, each of said units including a stylus and a recording medium, each of said styli being movable in a direction parallel to its associated recording medium and in a direction normal to its associated recording medium to reproduce data thereon, a stylus control signal transmission system comprising: a carrier signal generator for developing a carrier signal having a given fundamental frequency; first means, effectively coupled to said transmitter stylus and to said carrier signal generator, for varying the frequency of said carrier signal at a rate and amplitude representative of movements of said stylus in a direction parallel to its associated recording medium; means, effectively coupled to said transmitter stylus and to said carrier signal generator, for changing the frequency of said carrier signal at a fixed rate substantially greater than the maximum rate of change in frequency afforded by said first means, in response to movement of said stylus, in a direction normal to its associated recording medium, from a recording position to an inactive position; and means for transmitting said carrier signal from said transmitter to said receiver.

5. In a graphic communication system of the kind including a transmitter unit and a receiver unit, each of said units including a stylus and a recording medium, each of said styli being movable in a direction parallel to its associated recording medium and in a direction normal to its associated recording medium to reproduce data thereon, a stylus control signal transmission system comprising: a carrier signal generator comprising an oscillator for developing a carrier signal having a given fundamental frequency and including a frequency-determining circuit including a principal impedance; first means, mechanically coupled to said transmitter stylus and effectively coupled to said principal impedance, for varying the frequency of said carrier signal at a rate and by an amount representative of movement of said stylus in a given coordinate direction parallel to its associated recording medium; a control signal generator for generating a control signal having an operating frequency substantially smaller than said carrier frequency and substantially greater than the maximum rate of change in frequency afforded by said first means; modulator means, coupled to said control signal generator and to said carrier signal generator, for modulating the frequency of said carrier signal in accordance with said control signal; means for effectively opening and closing the coupling circuit from said control signal generator to said modulator in response to movement of said stylus, in a direction normal to its associated recording medium, between a recording and an inactive position; and means for transmitting said carrier signal from said transmitter to said receiver.

6. In a graphic communication system of the kind including a transmitter unit and a receiver unit, each of said units including a stylus and a recording medium, each of said styli being movable in a direction parallel to its associated recording medium and in a direction normal to its associated recording medium to reproduce data thereon, a stylus control signal transmission system comprising: a carrier signal generator comprising an oscillator for developing a carrier signal having a given fundamental frequency and including a frequency-determining circuit including a variable impedance; first means, mechanically coupled to said transmitter stylus and to said variable impedance, for adjusting said impedance to modulate the frequency of said carrier signal in response to movement of said stylus in a given coordinate direction parallel to its associated recording medium; a control signal generator, for generating a control signal having an operating frequency substantially lower than said carrier frequency and substantially higher than the maximum rate of change in frequency afforded by said first means; modulator means, effectively coupling said control signal generator to said carrier signal generator, for modulating the frequency of said carrier signal in accordance with said control signal; a switch, mounted on said stylus and connected in circuit with said control signal generator for energizing and de-energizing said control signal generator in response to movement of said stylus, in a direction normal to its associated recording medium, between a recording and an inactive position; and means for transmitting said carrier signal from said transmitter to said receiver.

7. In a graphic communication system of the kind including a transmitter unit and a receiver unit, each of said units including a stylus and a recording medium, each of said styli being movable in a direction parallel to its associated recording medium and in a direction normal to its associated recording medium to reproduce data thereon, a stylus control signal transmission system comprising: a carrier signal generator for developing a carrier signal having a given fundamental frequency; a position transformer, electrically coupled to said carrier signal generator and mechanically coupled to said transmitter stylus, for generating a first control signal having a polarity and amplitude representative of movements of said transmitter stylue along a given axis in a direction parallel to its associated recording medium and having a frequency equal to the instantaneous operating frequency of said carrier oscillator; means, coupled to said position transformer and to said carrier signal generator, for modulating the frequency of said carrier signal in accordance with the phase and amplitude of said first control signal; modulator means, effectively coupled to said transmitter stylus and to said carrier signal generator, for modulating the frequency of said carrier signal by a predetermined amount in response to movement of said stylus, in a direction normal to its associated recording medium, between a recording position and an inactive position; and means for transmitting said carrier signal from said transmitter to said receiver.

8. In a graphic communication system of the kind including a transmitter unit and a receiver unit, each of said units including a stylus and a recording medium, each of said styli being movable in a first direction, parallel to its associated recording medium and in a second direction normal to its associated recording medium to reproduce data thereon, said system comprising: a carrier signal generator comprising an oscillator for developing a carrier signal having a given fundamental frequency and including a frequency determining impedance and an output circuit; a position transformer electrically coupled to said output circuit and mechanically coupled to said transmitter stylus, for generating a first control signal having a polarity and amplitude representative of movements of said transmitter stylus in said first direction and having a frequency equal to the instantaneous operating frequency of said carrier oscillator; a control signal generator, electrically coupled to said output circuit, for generating a second control signal having a frequency equal to the instantaneous operating frequency of said carrier oscillator but reversing in phase at a predetermined control frequency; means, coupled to said position transformer, said control signal generator, and to said carrier signal generator, for applying both of said control signals to said frequency-determining impedance to modulate the frequency of said carrier signal in accordance with said first and second control signals; means for effectively interrupting application of said control signal to said impedance whenever said transmitter stylus is moved in said second direction to an inactive position relative to said recording medium; and means for transmitting said carrier signal from said transmitter to said receiver.

9. A frequency modulation system comprising: an amplifier having an input circuit and an output circuit, said input circuit including a frequency-determining resonant circuit comprising a capacitive reactance and an inductive reactance and having a predetermined normal resonant frequency; a feedback circuit coupling said output circuit of said amplifier in series with one of said input circuit reactances for applying a feedback signal to said one reactance having a frequency equal to the output signal frequency of the amplifier; amplitude modulator means, coupled in series in said feedback circuit, for modulating the amplitude of the feedback signal from said output circuit to said one input circuit reactance in response to an applied signal; and means for applying a control signal to said amplitude modulator to modulate the amplitude of said feedback signal and thereby modulate the frequency of the input signal to said amplifier by varying the effective resonant frequency of said input circuit.

10. A frequency modulation system comprising: an amplifier having an input circuit and an output circuit, said input circuit including a frequency-determining resonant circuit comprising a capacitive reactance and an inductive reactance and having a predetermined normal resonant frequency, said output circuit comprising a transformer having at least one secondary winding; a feedback circuit coupling said secondary winding in series with one of said input circuit reactances, for applying a feedback signal to said one reactance having a frequency equal to the output signal frequency of the amplifier; amplitude modulator means, coupled in series in said feedback circuit, for modulating the amplitude of the feedback signal from said output circuit to said one input circuit reactance in response to an applied signal; and means for applying a control signal to said amplitude modulator to modulate the amplitude of said feedback signal and thereby modulate the frequency of the input signal to said amplifier by varying the effective resonant frequency of said input circuit.

11. A frequency modulation system comprising: an oscillator having an input circuit and an output circuit, said input circuit including a frequency-determining resonant circuit comprising a capacitive reactance and an inductive reactance and having a predetermined normal resonant frequency; a feedback circuit coupling said output circuit of said oscillator in series with one of said input circuit reactances for applying a feedback signal to said one reactance having a frequency equal to the output signal frequency of the oscillator; amplitude modulator means, coupled in series in said feedback circuit, for modulating the amplitude of the feedback signal from said output circuit to said one input circuit reactance in response to an applied signal, said amplitude modulator means comprising a transformer having primary and secondary windings, a pair of diodes connected in opposing relation to each other across said primary winding, means for applying said feedback signal to one winding of said transformer, and means for applying a control signal to said transformer, one of said signals being applied in push-push relation and the other in push-pull, to modulate the amplitude of said feedback signal and thereby modulate the frequency of the input signal to said oscillator by varying the effective resonant frequency of said input circuit.

12. A frequency modulation system comprising: a first amplifier having an input circuit and an output circuit, said input circuit including a frequency-determining resonant circuit comprising a capacitive reactance and an inductive reactance and having a predetermined normal resonant frequency; a second amplifier coupled in a positive feedback circuit from said output circuit to said input circuit of said first amplifier to afford an oscillator having a normal operating frequency equal to said resonant frequency; a second feedback circuit coupling said output circuit of said amplifier in series with one of said input circuit reactances for applying a feedback signal to said one reactance having a frequency equal to the output signal frequency of the oscillator; amplitude modulator means, coupled in series in said second feedback circuit, for modulating the amplitude of the feedback signal from said output circuit to said one input circuit reactance in response to an applied signal; and means for applying a control signal to said amplitude modulator to modulate the amplitude of said feedback signal and thereby modulate the operating frequency of the oscillator by varying the effective resonant frequency of said input circuit.

13. In a graphic communication system of the kind including a transmitter unit and a receiver unit, each of said units including a stylus and a recording medium, each of said styli being movable in a direction parallel to its associated recording medium and in a direction normal to its associated recording medium to reproduce data thereon, a stylus control signal transmission system comprising: a carrier signal generator for developing a carrier signal having a given fundamental frequency, said carrier signal generator comprising an amplifier having an input circuit and an output circuit, said input circuit including a frequency-determining resonant circuit comprising a capacitive reactance and an inductive reactance;

first means, effectively coupled to said transmitter stylus and to said carrier signal generator, for varying the frequency of said carrier signal at a rate and amplitude representative of movements of said stylus in a direction parallel to its associated recording medium, said first means including a feedback circuit coupling said output circuit of said amplifier in series with one of said input circuit reactances, for applying a feedback signal to said one reactance having a frequency equal to the output signal frequency of the oscillator, and a variable coupling impedance connected to said stylus for varying the amplitude of said feedback signal; second means, effectively coupled to said transmitter stylus and to said carrier signal generator, for changing the frequency of said carrier signal at a fixed rate substantially greater than the maximum rate of change in frequency afforded by said first means, in response to movement of said stylus, in a direction normal to its associated recording medium, from a recording position to an inactive position, said second means including an amplitude modulator, coupled in series in said feedback circuit, for modulating the amplitude of the feedback signal from said output circuit to said one input circuit reactance in response to an applied signal, means for applying a control signal to said amplitude modulator to modulate the amplitude of said feedback signal and thereby modulate the frequency of the input signal to said amplifier by varying the effective resonant frequency of said input circuit, and means for actuating said signal applying means in response to movement of said stylus between said inactive position and said recording position; and means for transmitting said carrier signal from said transmitter to said receiver.

14. A graphic communication system of the kind including a transmitter unit and a receiver unit, each of said units including a stylus and a recording medium, each of said styli being movable parallel to its associated recording medium and being actuatable between a recording and a non-recording condition to reproduce data thereon, said system comprising: a carrier signal generator for developing a carrier signal having a given fundamental frequency; means, effectively coupled to said transmitter stylus and to said carrier signal generator, for varying the frequency of said carrier signal in response to movements of said transmitter stylus in a direction parallel to its associated recording medium; means, coupled to said transmitter stylus and to said carrier signal generator, for modulating the frequency of said carrier signal in response to actuation of said transmitter stylus between its recording and non-recording conditions; means for transmitting said carrier signal from said transmitter to said receiver; discriminator means, in said receiver, for utilizing said carrier signal to develop a data signal representative of variations in frequency of said carrier signal; filter means, coupled to said discriminator means, for developing a first control signal representative of movements of said transmitter stylus parallel to said recording medium and a second control signal representative of actuation of said transmitter stylus between recording and non-recording condition; and first and second control means, coupled to said filter means and controlled by said first and second control signals, respectively, for actuating said receiver stylus, with respect to its associated recording medium, in accordance with actuation of said transmitter stylus.

15. In a graphic communication system of the kind including a transmitter unit and a receiver unit, each of said units including a stylus and a recording medium, each of said styli being movable in a direction parallel to its associated recording medium and being actuatable between a recording and a non-recording condition to reproduce data thereon, a stylus control signal transmission system comprising: a carrier signal generator for developing a carrier signal having a given fundamental frequency; first means, effectively coupled to said transmitter stylus and to said carrier signal generator, for varying the frequency of said carrier signal at a rate and amplitude representative of movements of said stylus in a direction parallel to its associated recording medium; means, effectively coupled to said transmitter stylus and to said carrier signal generator, for changing the frequency of said carrier signal at a fixed rate substantially greater than the maximum rate of change in frequency afforded by said first means, in response to actuation of said stylus between its recording and non-recording conditions; and means for transmitting said carrier signal from said transmitter to said receiver.

References Cited in the file of this patent

UNITED STATES PATENTS

| | | |
|---|---|---|
| 2,441,567 | Darlington | May 18, 1948 |
| 2,583,535 | Adler | Jan. 29, 1952 |
| 2,904,631 | Anderson | Sept. 15, 1959 |